United States Patent
Tanabe

(10) Patent No.: US 7,308,380 B2
(45) Date of Patent: Dec. 11, 2007

(54) VEHICULAR COLLISION OBJECT DETERMINING SYSTEM

(75) Inventor: Takatoshi Tanabe, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/248,432

(22) Filed: Oct. 13, 2005

(65) Prior Publication Data
US 2006/0100763 A1    May 11, 2006

(30) Foreign Application Priority Data
Oct. 21, 2004  (JP)  ............. 2004-307140

(51) Int. Cl.
*B60R 21/34* (2006.01)
*G06F 19/00* (2006.01)

(52) U.S. Cl. ............ 702/127; 180/271; 180/274; 340/436; 702/41; 702/42; 702/128; 702/138; 702/139

(58) Field of Classification Search ........... 180/271, 180/274; 340/425.5, 426.24, 436, 665; 701/36, 701/45; 702/41, 42, 94, 127, 128, 138, 139
See application file for complete search history.

(56) References Cited

U.S. PATENT DOCUMENTS

| | | | | |
|---|---|---|---|---|
| 2,762,995 A | * | 9/1956 | Gilbert | 340/436 |
| 4,304,629 A | * | 12/1981 | Byford | 376/245 |
| 6,271,747 B1 | * | 8/2001 | Fendt et al. | 340/436 |
| 6,442,485 B2 | * | 8/2002 | Evans | 701/301 |
| 6,561,301 B1 | | 5/2003 | Hattori et al. | |
| 6,929,282 B1 | * | 8/2005 | Zoratti et al. | 280/735 |
| 7,036,621 B2 | * | 5/2006 | Takafuji et al. | 180/274 |
| 2001/0043011 A1 | * | 11/2001 | Ugusa et al. | 307/10.1 |
| 2004/0011582 A1 | * | 1/2004 | Aoki | 180/274 |
| 2004/0108157 A1 | * | 6/2004 | Takafuji et al. | 180/274 |
| 2004/0129479 A1 | | 7/2004 | Ozaki | |
| 2004/0186643 A1 | * | 9/2004 | Tanaka et al. | 701/45 |
| 2005/0209754 A1 | | 9/2005 | Kiribayashi | |

FOREIGN PATENT DOCUMENTS

| | | |
|---|---|---|
| JP | A-7-190732 | 7/1995 |
| JP | 10-95305 A * | 4/1998 |
| JP | A-11-28994 | 2/1999 |
| JP | A-2004-156945 | 6/2004 |
| WO | WO 01/23224 A1 * | 4/2001 |

* cited by examiner

*Primary Examiner*—Edward R Cosimano
(74) *Attorney, Agent, or Firm*—Posz Law Group, PLC

(57) ABSTRACT

A planar pressure-sensitive switch unit has multiple pressure-sensitive switches that are disposed in a longitudinal direction of a bumper cover of a vehicle with given intervals for detecting the number of collision objects. Collision load sensors are disposed between a bumper reinforcement and side members for detecting a total collision load by adding up two outputs. Then, a collision load per a single collision object is computed by dividing the total collision load by the number of collision objects and is compared with a collision load corresponding to a pedestrian. Thus, even when the vehicle collides with multiple objects at the same time, collision with a pedestrian can be properly determined.

9 Claims, 5 Drawing Sheets

VEHICULAR COLLISION OBJECT DETERMINING SYSTEM

CROSS REFERENCE TO RELATED APPLICATIONS

This application is based on and incorporates herein by reference Japanese Patent Application No. 2004-307140 filed on Oct. 21, 2004.

FIELD

The present invention relates to a vehicular collision object determining system.

BACKGROUND

There are known technologies that detect collision loads at vehicular collision. In Patent Document 1, collision loads are detected by measuring tension variations of a wire that is horizontally disposed with a given initial tension along the front of a bumper reinforcement.

In Patent Document 2, a pair of parallel conductive wires is horizontally disposed at the front of a vehicle. Collision is detected by determining whether the two wires make contact to each other due to collision impact.

In Patent Document 3, a light-leaking fiber is horizontally disposed along a front bumper of a vehicle. The fiber has a light projecting end unit and a light receiving end unit. Collision is detected by decrease of the receiving light amount in the light receiving end unit; this decrease occurs because of deformation or breakage of the fiber.

There are recently increasing requests about pedestrian protections against vehicular collisions. These requests facilitate proposals of pedestrian protection systems. Here, activating a pedestrian protection system when a collision object is not a pedestrian may cause adverse influence. Therefore, determining whether a collision object is a pedestrian is required.

In Patent Document 4, it is proposed that a pedestrian is determined based on a time period during which a collision load exceeds a given level. Furthermore, in Patent Document 5, a pedestrian is determined based on an increase rate of a collision load after exceeding a given level. Yet furthermore, it is proposed that a pedestrian is determined based on a peak value of a collision load.

In the above technologies, a pedestrian is determined using collision waveforms detected by collision load sensors. Namely, a collision with a pedestrian is determined whether detected collision waveforms fall within a range of waveforms representing a collision with a pedestrian.

Here, when multiple objects collide with a vehicle at the same time, a collision load sensor detects a total of multiple collision loads, thereby decreasing a pedestrian determining accuracy. In detail, there is a case where multiple lightweight objects collide with a vehicle at the same time and then a collision load sensor detects a total of collision loads, thereby mis-determining that the vehicle collides with a pedestrian. In contrast, there is a case where multiple pedestrians collide with a vehicle at the same time and then a collision load sensor detects a total of collision loads from the multiple pedestrians, thereby mis-determining that the vehicle does not collide with a pedestrian.

Patent Document 1: JP-2004-212281 A
Patent Document 2: JP-2004-156945 A
Patent Document 3: JP-H7-190732 A
Patent Document 4: JP-H11-028994 A
Patent Document 5: JP-H11-310095 A

SUMMARY

It is an object of the present invention to provide a vehicular collision object determining system that is capable of solving the above problem. The vehicular collision object determining system has a less complicated structure and is capable of determining a kind of a collision object with a high accuracy even when a vehicle collides with multiple objects at the same time.

To achieve the above object, a collision object determining system for a vehicle is provided with the following. A collision load detector is included for detecting a collision load when a collision object collides with the vehicle. A collision object determining unit is included for determining a kind of the collision object based on whether the collision load is in a range determined by a given threshold value. A collision object number detector is included for detecting the number of collision objects that simultaneously collide with different points of a bumper of the vehicle. Here, the collision object determining unit substantially increases the given threshold value when the number of collision objects increases.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION

First Embodiment

Figure 1:
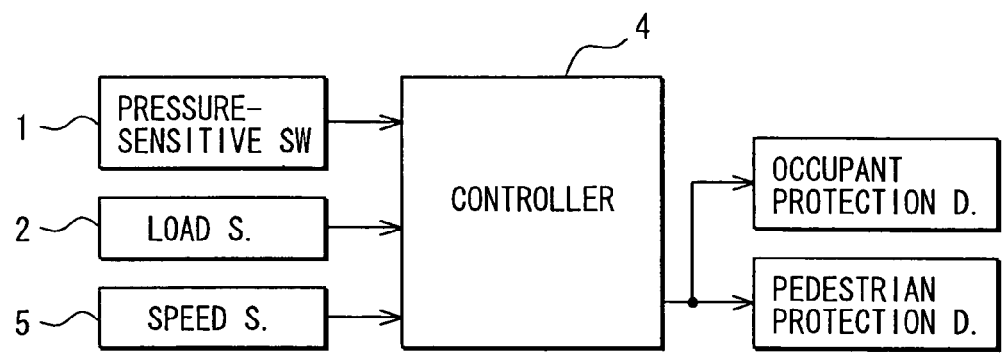
FIG. 1 is a block diagram of a vehicular collision object determining system according to a first embodiment of the present invention.
Figure 2:
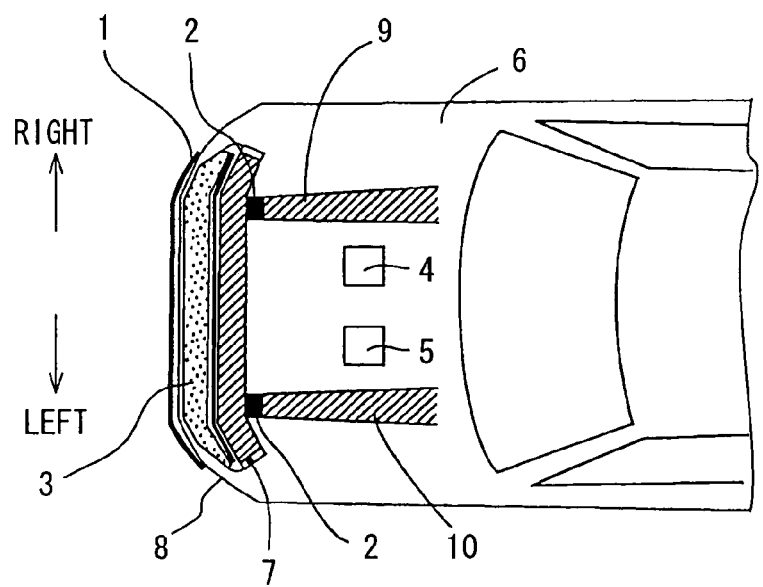
FIG. 2 is a schematic perspective plan view of the vehicular collision object determining system according to the first embodiment.

A vehicular collision object determining system mounted in a vehicle of a first embodiment has a structure to be explained with reference to FIGS. 1, 2. FIG. 2 shows a planar pressure-sensitive switch unit (SW) 1 functioning as a collision object number detector; two collision load sensors functioning as a collision load detector) 2; a bumper absorber 3; a controller 4; a speed sensor 5; a vehicle body 6; a bumper reinforcement 7; a bumper cover 8; and side members 9, 10. Here, the bumper absorber 3, the bumper reinforcement 7, and the bumper cover 8 are included in a bumper.

The controller 4 is a signal processing circuit having a micro-computer. The controller 4 determines whether a collision object is a pedestrian based on output signals from the planar pressure-sensitive switch unit 1, the load collision sensors 2, and the speed sensor 5. When the collision object is determined to be a pedestrian, the controller 4 operates a known pedestrian protection device (not shown), for example, a pedestrian-protection airbag system or a hood flip-up device. Furthermore, when a collision impact is large, the controller 4 operates an occupant protection device, for example, an occupant-protection airbag system.

The planar pressure-sensitive switch unit 1 is horizontally (or in a side to side direction) extending to be attached to the front of the bumper cover 8 in the longitudinal direction of the bumper cover 8. The planar pressure-sensitive switch unit 1 includes many pressure-sensitive switches that are horizontally arranged with pitches (or intervals) in the longitudinal direction of the bumper cover 8. The individual pressure-sensitive switches turn on based on a collision load being a certain value or more. The pressure-sensitive switches can use known pressure-sensitive switches. An example of the pressure-sensitive switches is shown in FIG. 3.

Figure 3:
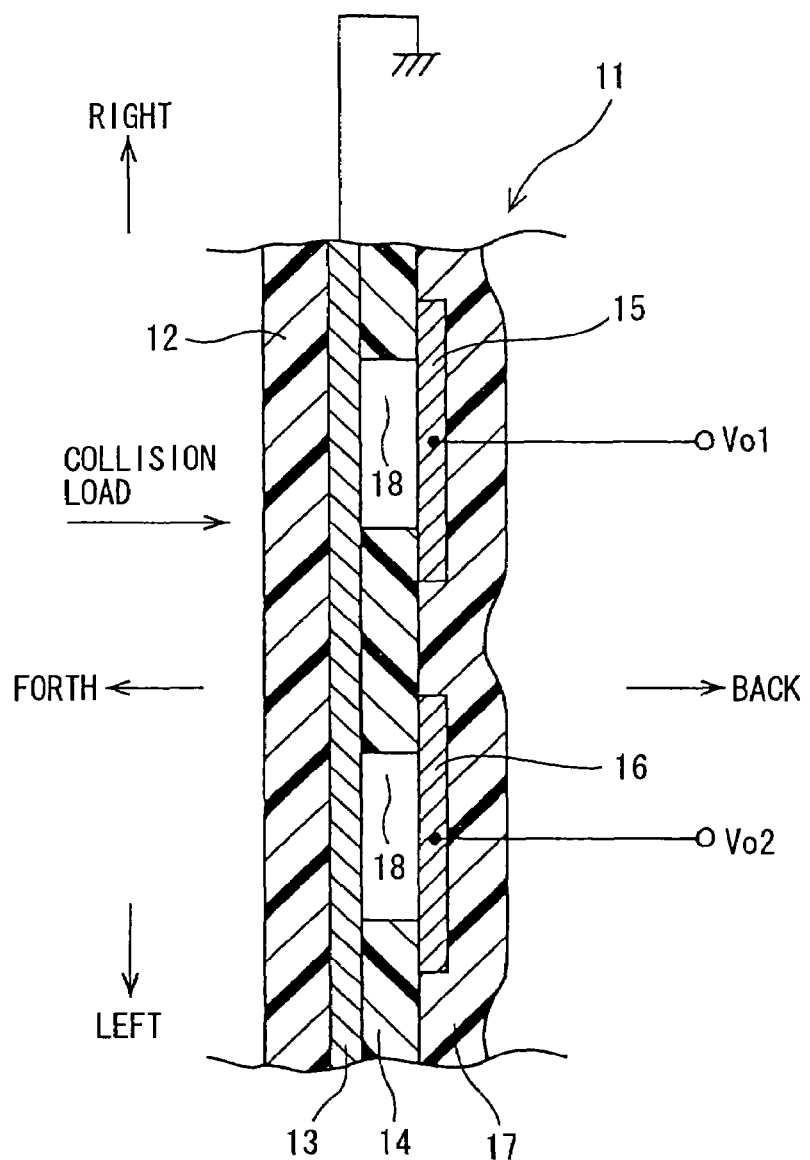
FIG. 3 is a schematic transverse cross-sectional view of a planar pressure-sensitive switch unit according to the first embodiment.

FIG. 3 shows a film-type pressure-sensitive switch unit 11, which includes: a front protection resin film 12; a grounding electrode layer 13; a spacer 14; detection electrode layers 15, 16; and a rear protection resin film 17. The front protection resin film 12 and the rear protection resin film 17 envelop the grounding electrode layer 13, the spacer 14, and the detection electrode layers 15, 16. The spacer 14 is a resin film and includes openings 18 that are horizontally arranged with intervals. The grounding electrode layer 13 and the detection electrode layers 15, 16 face the openings 18. The spacer 14 has a given thickness enough to prevent electrical contact between the grounding electrode layer 13 and the detection electrode layers 15, 16 as long as no collision takes place. The detection electrode layers 15, 16 are supplied with power voltage via a load resistance. When a collision load being a certain value or more acts from the front protection resin film 12 to the detection electrode layer 15, the front protection resin film 12 and the grounding electrode layer 13 bend. The grounding electrode layer 13 thereby contacts the detection electrode layer 15, causing the voltage Vo1 of the detection electrode layer 15 to switch from a high level to a low lever. The detection electrode layer 15 then reports a collision occurrence taking place at the position of the layer itself to the controller 4. Similarly, this detection process takes place with respect to the detection electrode layer 16 when a collision load being the certain value or more acts from the front protection resin film 12 to the detection electrode layer 16. If intervals or arranging pitches of multiple detection electrode layers 15, 16 within the pressure-sensitive switch unit 11 become small, a collision width of a collision object can be detectable.

Here, the front protection resin film 12 can be attached to the bumper cover 8 so that the detection electrode layers 15, 16 and the rear protection resin film 17 bend because of a collision load. The front protection resin film 12 and the rear protection resin film 17 can be made of rubber to enhance resilience.

Figure 4:
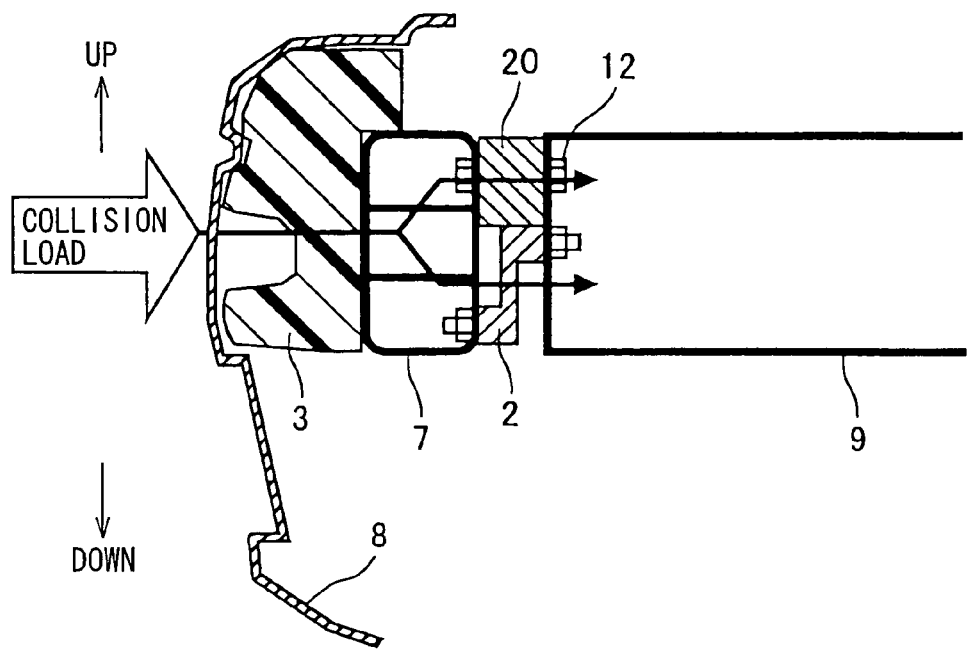
FIG. 4 is a schematic vertical cross-sectional view of a collision load sensor according to the first embodiment.

The two collision load sensors 2 are disposed between the rear surface of the bumper reinforcement 7 and the front ends of the side members 9, 10, respectively, as shown in FIG. 2. An example of the collision load sensor 2 will be explained with reference to FIG. 4.

The upper rear portion of the bumper reinforcement 7 bolts to the upper portion of the front end of the side member 9 via a collision load bypass body 20. (Similarly, the bumper reinforcement 7 bolts to the side member 10.) The collision load bypass body is made of metal, resin, or hard rubber, and is block-shaped or plate-shaped.

The collision load sensor 2 is formed so that a film-type or string-type strain gauge is attached on a surface of a metal plate that has a vertical cross-sectional shape of a crank. The upper top end of the collision load sensor 2 being crank-shaped has a bolt head that penetrates through a hole in a central portion of the front end of the side member 9 to be fixed with a nut. Similarly, the lower tail end of the collision load sensor 2 is fixed to the lower portion of a rear surface of the bumper reinforcement 7.

Thus, a collision load runs in an order of the bumper cover 8, the bumper absorber 3, and the bumper reinforcement 7, and diversifies into the upper-located collision load bypass body 20 and the lower-located collision load sensor 2. Even if the collision load bypass body 20 is a metal rigid body that is not easily deformed plastically or elastically, the collision load deforms the lower portion of the bumper reinforcement 7 rearward, thereby deforming the lower portion of the vertical central portion of the collision load sensor 2. Consequently, the strain gauge attached to the vertical central portion of the collision load sensor 2 receives stress, varying the resistance value. Detecting of the resistance variations enables detection of the collision load. The collision load bypass body 20 is used for preventing excessive collision load from acting on the collision load sensor 2; however, it can be removed. Furthermore, the collision load bypass body 20 can be elastic material.

Figure 5:
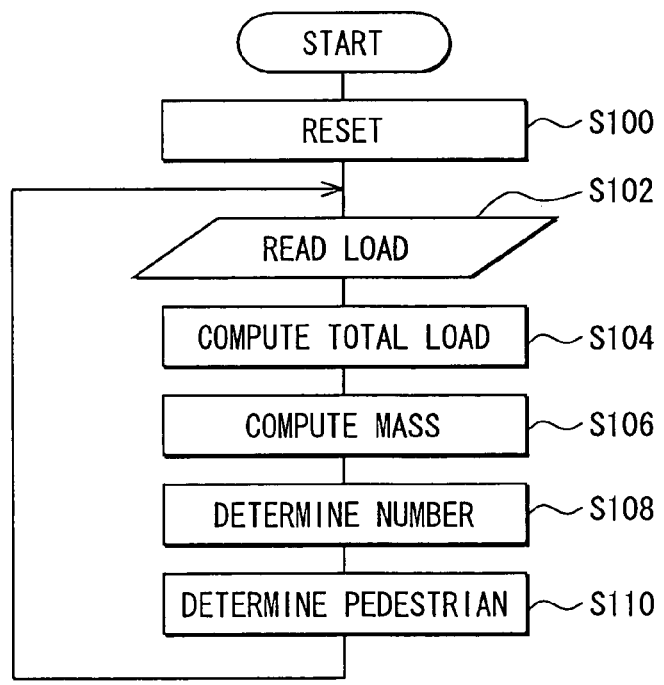
FIG. 5 is a flowchart diagram of a pedestrian determining operation according to the first embodiment.

The pedestrian determining operation by the controller 4 will be explained with reference to FIG. 5. Here, the operation by the controller 4 may be executed using a CPU, a ROM, and the like. Steps in the operation may be constructed as means or units in program stored in the ROM and the like.

At Step S100, various parts of the micro-computer are reset to initial states. At Step S102, collision loads are read from the two collision load sensors 2; operating states of individual pressure-sensitive switches of the planar pressure-sensitive switch unit 1 are read; and a vehicle speed is read from the speed sensor 5. Here, the pressure-sensitive switch outputs a low level when receiving a collision load being a certain relatively low value or more. Next, at Step S104, a total collision load that is force acting on the front of the vehicle is computed by adding up the two collision loads from the collision load sensors 2.

Next, at Step S106, the computed total collision load and the read speed are substituted for a previously stored map to compute a mass of the collision object. The mass is obtained from dividing the total collision load by a speed change rate.

Next, at Step S108, the number of collision objects is determined based on the read operating states of the individual pressure-sensitive switches. In detail, when multiple adjoining switches are in the operating state, presence of one collision object is supposed; namely, a series of adjoining switches in the operating state indicate a single collision object. When two potential collision objects are indicated while a certain number of switches that are in the non-operating state are present between the indicated two potential collision objects, the two potential collision objects are recognized as one collision object as long as the certain number is a given value (e.g., one) or less. When a detected collision load corresponds to a pedestrian and two potential collision objects interleave non-operating switches of a given number having a given range, the two potential collision objects are regarded as a single collision object corresponding to a pedestrian. Here, the non-operating switches correspond to a gap between two legs of a pedestrian who faces the front of the bumper cover 8. However, if the detected collision load does not correspond to a pedestrian, these two potential collision objects are regarded as two collision objects being not pedestrians. Thus, the number of collision objects collide at the same time can be determined while influence of the gap of pedestrian's legs can be solved or eliminated. Furthermore, a slightly uneven or bumpy surface of a collision object can be disregarded.

Next, a mass per a collision object is obtained by dividing the total collision load by the above determined number of collision objects. Further, a collision load after amendment using a vehicle speed is obtained. Both of the mass and the collision load after amendment are substituted for a map that previously stores corresponding waveforms and magnitudes, determining whether the both of the mass and the collision load after amendment correspond to a pedestrian. When they are determined to be corresponding to a pedestrian, the collision object is determined to be a pedestrian at Step S110.

Here, the detected collision load is divided by the number of collision objects and compared with a given threshold value; alternatively, the detected collision load can be directly compared with a threshold value that is obtained by multiplying the given threshold value by the number of collision objects. Namely, both cases mean that a threshold value for detecting a collision object is substantially increased when the number of collision objects is increased.

Furthermore, a collision load and a vehicle speed have positive correlation. When it is determined whether a collision object is a pedestrian, either of (i) a threshold value (or range) of a collision load corresponding to a pedestrian or (ii) a detected collision load is amended. For instance, when the threshold value is not amended, the detected collision load is amended to be decreased with increasing vehicle speed. Alternatively, when the detected collision load is not amended, the threshold value is amended to be increased with increasing vehicle speed.

In the above, it is determined whether a collision object is a pedestrian; however, it is also determined whether a collision object is an object other than a pedestrian. Furthermore, a width of a collision object can be detected using operating patterns of the planar pressure-sensitive switch unit 1, and a rigidity of a collision object can be detected using collision load waveforms. These parameters can be additionally used for determining a pedestrian.

Modification

In this first embodiment, the collision load sensors 2 are interleaved between the bumper reinforcement 7 and the side members 9, 10, respectively. Alternatively, the collision load sensors 2 can be attached to the bumper cover 8, similarly to the planar pressure-sensitive switch unit 1.

Second Embodiment

Figure 6:
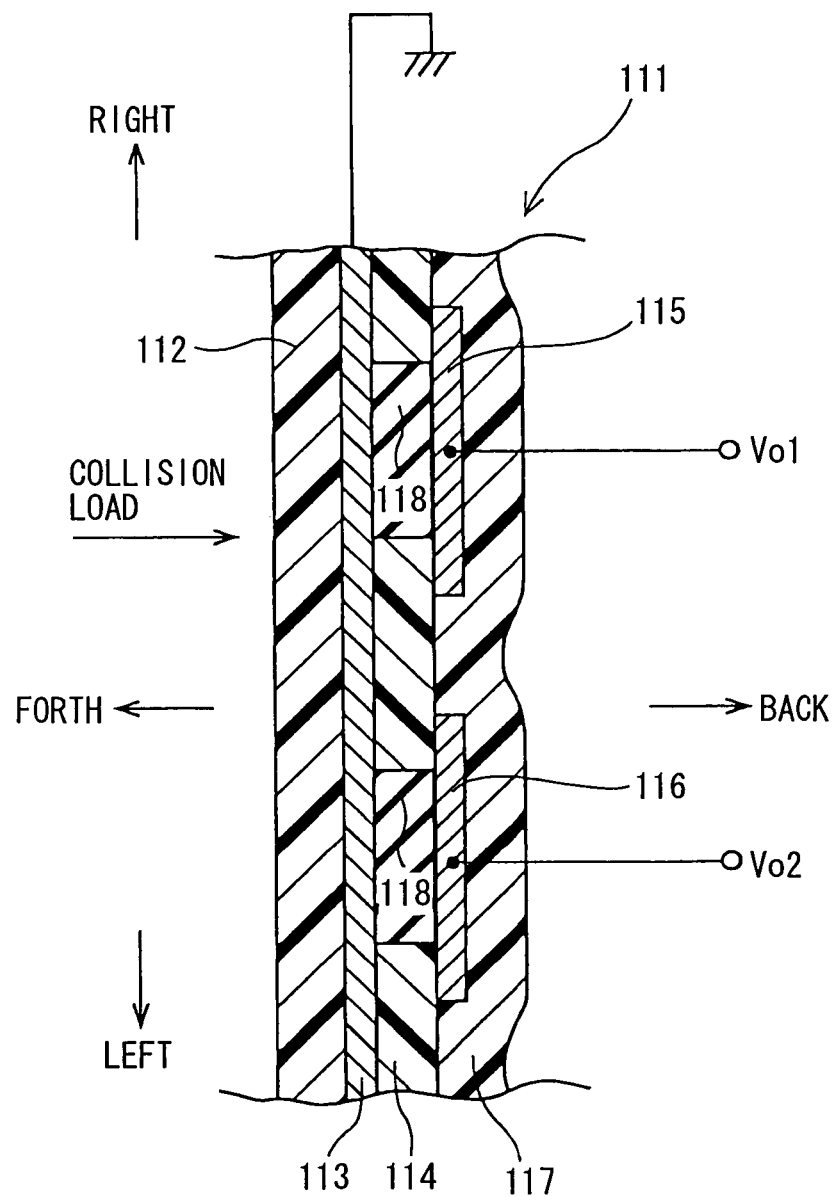
FIG. 6 is a schematic transverse cross-sectional view of a planar pressure-sensitive sensor unit according to a second embodiment of the present invention.
Figure 7:
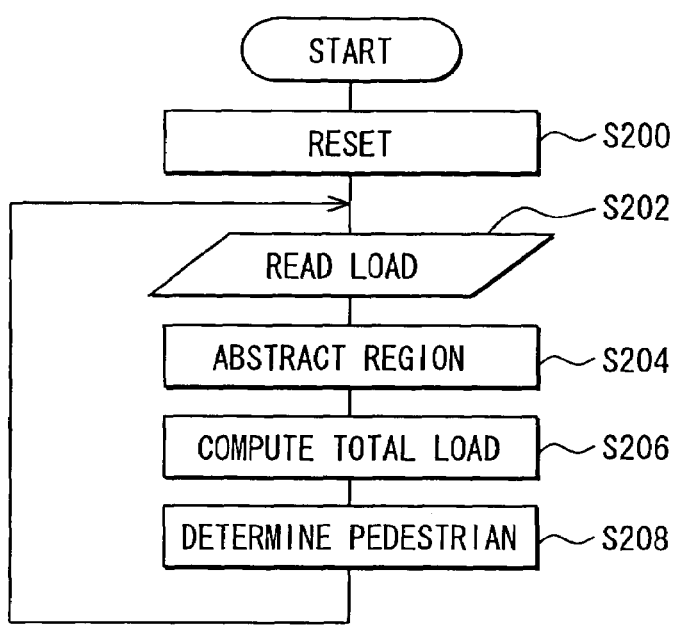
FIG. 7 is a flowchart diagram of a pedestrian determining operation according to the second embodiment.

A second embodiment of the vehicular collision object determining system will be explained with reference to FIGS. 6, 7. In the second embodiment, functions of both the collision load sensors 2 and the planar pressure-sensitive switch unit 1 are performed by a planar pressure-sensitive sensor unit (or pressure-sensitive sensor group) 111. Namely, the planar pressure-sensitive sensor unit 111 works as a collision object number detector and a collision load detector. Further, a controller 4 of this embodiment includes a computation circuit that substantially computes the number of collision objects based on signal patterns output from the planar pressure-sensitive sensor unit 111.

The planar pressure-sensitive sensor unit 111 is horizontally extending to be attached to the front of the bumper cover 8. The planar pressure-sensitive sensor unit 111 includes multiple pressure-sensitive sensors (or detection electrode layers) 115, 116 that are horizontally arranged with pitches (or intervals) along the bumper cover 8. The detection electrode layers 115, 116 vary electrical resistances based on variations of individual collision loads.

The planar pressure-sensitive sensor unit 111 further includes: a front protection resin film 112; a grounding electrode layer 113; a flexible rubber-film spacer 114 that can be removed; and a rear protection resin film 117. The front protection resin film 112 and the rear protection resin film 117 envelop the grounding electrode layer 113, the spacer 114, and the detection electrode layers 115, 116. The grounding electrode layer 113 and the detection electrode layer 115, 116 interleave pressure-sensitive variable resistance films 118 made of carbon-containing rubber film.

The detection electrode layers 115, 116 are supplied with power voltage via a load resistance. When a collision load being a certain value or more acts from the front protection resin film 112 to the detection electrode layer 115, the front protection resin film 112 and the grounding electrode layer 113 bend. The grounding electrode layer 113 thereby compresses the pressure-sensitive variable resistance film 118 in its thickness direction, causing the pressure-sensitive variable resistance film 118 to decrease its electric resistance in the thickness direction. Supplying the detection electrode layer 115 with constant electric currents causes the voltage Vo1 of the detection electrode layer 115 to vary based on a collision load. Similarly, this process takes place with respect to the detection electrode layer 116, so that the voltage Vo2 of the detection electrode layer 116 varies based on a collision load. This kind of pressure-sensitive sensors is known. Other types of pressure-sensitive sensors can be also used in the embodiment.

The pedestrian determining operation by the controller 4 will be explained with reference to FIG. 7.

Figure 8:
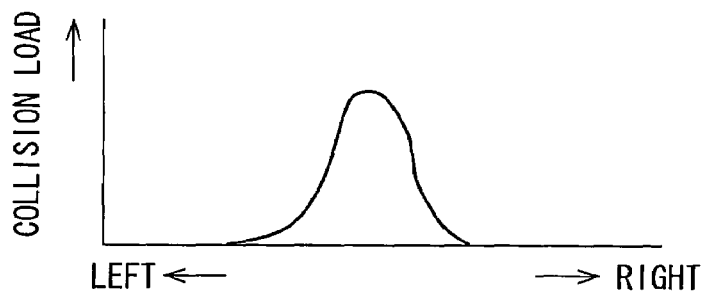
FIG. 8 is a waveform showing a load pattern of collision with a single pedestrian according to the second embodiment.
Figure 9:
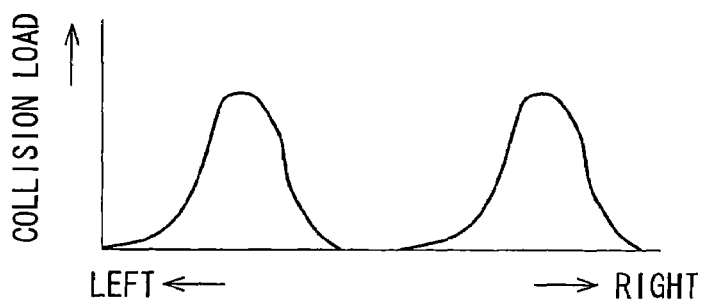
FIG. 9 is a waveform showing a load pattern of collision with two pedestrians having a space therebetween according to the second embodiment.

At Step S200, various parts of the micro-computer are reset to initial states. At Step S202, signal voltages corresponding to collision loads of the multiple pressure-sensitive sensors included in the planar pressure-sensitive sensor unit 111 are read and converted into a collision load pattern of a single dimension. Examples of the patterns are shown in FIGS. 8, 9. The pattern in FIG. 8 shows a single peak that shows collision with a single collision object. The pattern in FIG. 9 shows two peaks that show collision with two collision objects at the same time.

Next, at Step S204, independent collision regions that are independent from each other are extracted from the read collision load pattern. In detail, data of the pattern is converted into binary data using a certain threshold value that is similar to the signal pattern of the pressure-sensitive switch. A region of consecutive data having the same value is determined to be an independent collision region. Therefore, the collision load pattern in FIG. 8 indicates a single independent collision region, while the collision load pattern in FIG. 9 indicates two independent collision regions.

Here, a collision load pattern having no possibility of correspondence to a collision with a pedestrian can be removed from the extracted independent collision regions, using a known pattern matching. There may be a case where two legs of a single pedestrian collide with the planar pressure-sensitive sensor unit 111 at the same time. Here, two independent peaks (or patterns) which are present with a given interval having a range can be recognized as a single independent region. Furthermore, there may be a case where an uneven surface condition of the planar pressure-sensitive sensor unit 111 causes some adjoining pressure-sensitive sensors to have a collision load not being a threshold value or more. In this case, two independent collision regions interleaving a region that has less than a given interval and substantially does not detect collision may be regarded as a single independent region.

Next, at Step S206, a total collision load is computed with respect to each of the obtained independent collision regions. At Step S208, it is determined whether the obtained total collision load falls within a given threshold range. Only when the obtained total collision load is determined to be a pedestrian, this determination result is outputted to an outside, then returning to Step S202.

Modification

In the second embodiment, a total collision load is obtained with respect to each of independent collision regions (or each of multiple adjoining pressure-sensitive sensors that output collision loads being a certain threshold value or more). A pedestrian determination is performed by using this total collision load. However, the number of independent collision regions can be regarded as the number of collision objects, similarly to the first embodiment. The total of collision loads of all the pressure-sensitive sensors or the total of the collision loads of all the independent collision regions can be divided by the number of collision objects to obtain an average collision load. It can be then determined whether this average collision load corresponds to a collision with a pedestrian.

Furthermore, according to the second embodiment, widths of the individual collision regions can be obtained, so it can be additionally determined whether each of the widths corresponds to a pedestrian.

In the second embodiment, a single sensor is used for determining a collision load and the number of collision objects, so that the number of components can be decreased; furthermore, it can determine a pedestrian more accurately.

The collision load obtained at Step S202 or the threshold value of the collision load may be amended using a vehicle speed from the vehicle speed sensor 5 when it is determined whether a collision object is a pedestrian at Step S208, similarly to Step S10 in the first embodiment.

In the second embodiment, the planar pressure-sensitive sensor unit 111 is attached (or glued) to the front of the bumper cover 8; however, it can be disposed at other positions in the vehicle.

It will be obvious to those skilled in the art that various changes may be made in the above-described embodiments of the present invention. However, the scope of the present invention should be determined by the following claims.

What is claimed is:

1. A collision object determining system for a vehicle, the collision object determining system, comprising:
   a collision load detector, provided in the vehicle, configured to facilitate detecting a collision load;
   a collision object determining unit, configured to facilitate determining a kind of a collision object which collides with the vehicle, based on whether the collision load detected by the collision load detector is in a range determined by a given threshold value; and
   a collision object number detector, provided in the vehicle, configured to facilitate detecting a number of collision objects detected by the collision load detector that simultaneously collide with different points of a bumper of the vehicle,
   wherein the collision object determining unit is further configured to substantially increase the given threshold value when the number of collision objects detected by the collision object number detector increases,
   wherein the collision load detector includes a plurality of pressure-sensitive switches that are arranged in a longitudinal direction of the bumper with intervals and operate when receiving collision loads being a certain threshold value or more,
   wherein the collision object number detector is further configured to determine that the number of collision objects is one in a case where
   (i) a given small number of pressure-sensitive switches is included in the plurality of pressure-sensitive switches, wherein pressure-sensitive switches included in the given small number of pressure-sensitive switches do not operate, and
   (ii) two groups of pressure-sensitive switches are included in the plurality of pressure-sensitive switches to interleave the given small number of pressure-sensitive switches there between, wherein pressure-sensitive switches included in each of the two groups adjoin each other and individually operate by receiving collision loads being the certain threshold value or more.

2. The collision object determining system of claim 1,
   wherein collision object number detector is further configured to determine that the number of collision objects is one when the collision load detected by the collision load detector is in a range corresponding to collision with a pedestrian, and
   wherein the given small number of pressure-sensitive switches corresponds to a space of two legs of the pedestrian.

3. The collision object determining system of claim 1, further comprising:
   a speed sensor configured to facilitate detecting a speed of the vehicle,
   wherein the collision object determining unit substantially increases the given threshold value when the speed increases, while the collision object determining unit substantially decreases the given threshold value when the speed detected by the speed sensor decreases.

4. The collision object determining system of claim 1,
   wherein collision object number detector is further configured to determine that the number of collision objects is one in a case where a group of pressure-sensitive switches is included in the plurality of pressure-sensitive switches,
   wherein pressure-sensitive switches included in the group adjoin each other and are configured to individually operate by receiving collision loads being the certain threshold value or more.

5. A collision object determining system for a vehicle, the collision object determining system, comprising:
   a collision load detector, provided in the vehicle, configured to facilitate detecting a collision load;
   a collision object determining unit, configured to facilitate determining a kind of a collision object which collides with the vehicle, based on whether the collision load detected by the collision load detector is in a range determined by a given threshold value; and
   a collision object number detector, provided in the vehicle, configured to facilitate detecting a number of collision objects detected by the collision load detector that simultaneously collide with different points of a bumper of the vehicle, wherein the collision object determining unit is further configured to substantially increase the given threshold value when the number of collision objects detected by the collision object number detector increases, wherein the collision load detector and the collision object number detector is included in a pressure-sensitive sensor group that includes a plurality of pressure-sensitive sensors, wherein the plurality of pressure-sensitive sensors are arranged in a longitudinal direction of the bumper with intervals and operate when receiving collision loads being a certain threshold value or more, wherein collision object number detector is further configured to determine that a single collision object is corresponded to by two independent regions interleaving therebetween a given small number of pressure-sensitive sensors that do not operate, wherein each of the two independent regions includes a group of pressure-sensitive sensors included in the plurality of pressure-sensitive sensors, wherein pressure-sensitive sensors included in the group adjoin each other and individually operate by receiving collision loads being the certain threshold value or more.

6. The collision object determining system of claim 5, wherein collision object number detector is further configured to determine that a single collision object is corresponded to by the two independent regions interleaving therebetween the given small number of pressure-sensitive sensors in a case where the collision load detected by the collision load detector is in a range corresponding to collision with a pedestrian, wherein the given small number of pressure-sensitive sensors corresponds to a space of two legs of the pedestrian, wherein pressure-sensitive sensors included in the given small number of Pressure-sensitive sensors are configured to output collision loads being less than the certain threshold value, and wherein pressure-sensitive sensors included in the two groups are configured to output collision loads being the certain threshold value or more.

7. The collision object determining system of claim 5, wherein the collision object number detector is configured to detect at least three different points on the bumper of the vehicle, where collision objects simultaneously collide, to detect more than one pedestrian who collides with the bumper.

8. The collision object determining system of claim 5, further comprising:

a speed sensor configured to facilitate detecting a speed of the vehicle, wherein the collision object determining unit substantially increases the given threshold value when the speed increases, while the collision object determining unit substantially decreases the given threshold value when the speed detected by the speed sensor decreases.

9. The collision object determining system of claim 5, wherein collision object number detector is further configured to determine that a single collision object is corresponded to by an independent region that includes a group of pressure-sensitive sensors included in the plurality of pressure-sensitive sensors, wherein pressure-sensitive sensors included in the group adjoin each other and individually operate by receiving collision loads being the certain threshold value or more.

* * * * *